United States Patent
Mudigonda et al.

(10) Patent No.: US 9,621,402 B2
(45) Date of Patent: Apr. 11, 2017

(54) LOAD BALANCED AND PRIORITIZED DATA CONNECTIONS

(75) Inventors: Uma Mahesh Mudigonda, Andhra Pradesh (IN); Sai Ganesh Ramachandran, Andhra Pradesh (IN); Amit Kumar Nanda, Andhra Pradesh (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 296 days.

(21) Appl. No.: 13/230,518

(22) Filed: Sep. 12, 2011

(65) Prior Publication Data

US 2013/0067231 A1    Mar. 14, 2013

(51) Int. Cl.
*H04L 9/32* (2006.01)
*H04L 29/08* (2006.01)
*H04L 29/06* (2006.01)

(52) U.S. Cl.
CPC ...... *H04L 29/08144* (2013.01); *H04L 9/3215* (2013.01); *H04L 63/0823* (2013.01); *H04L 63/0428* (2013.01)

(58) Field of Classification Search
CPC ............. H04L 9/3294; H04L 29/08144; H04L 9/3215; H04L 63/0428; H04L 63/0823
USPC ....................................................... 713/175
See application file for complete search history.

(56) References Cited

U.S. PATENT DOCUMENTS

| 7,096,383 | B2 | 8/2006 | Talaugon et al. | |
| 7,376,743 | B1 * | 5/2008 | Bazzinotti et al. | 709/229 |
| 7,743,155 | B2 | 6/2010 | Pisharody et al. | |
| 7,945,666 | B2 | 5/2011 | Wunner | |
| 8,326,920 | B1 * | 12/2012 | Modadugu et al. | 709/203 |
| 2003/0195919 | A1 * | 10/2003 | Watanuki et al. | 709/105 |
| 2006/0230272 | A1 * | 10/2006 | Lawrence et al. | 713/176 |
| 2007/0186281 | A1 | 8/2007 | McAlister | |
| 2008/0104692 | A1 | 5/2008 | McAlister | |
| 2009/0245113 | A1 * | 10/2009 | Kamiya | H04L 65/80 370/238 |

(Continued)

OTHER PUBLICATIONS

Elio Salvadori and Robert Battiti, "Quality of Service in IP over WDM: considering both service differentiation and transmission quality," IEE Communication Society, 2004, pp. 1836-1840.*

(Continued)

*Primary Examiner* — James Turchen
*Assistant Examiner* — Canh Le
(74) *Attorney, Agent, or Firm* — Lee & Hayes PLLC

(57) ABSTRACT

In embodiments of load balanced and prioritized data connections, a first connection is established to communicate first data from a first server to a second server over a public network, where the first data is communicated from a private network to a first device or subnet that is connected to the second server. A second connection is established to communicate second data from the first server to the second server over the public network, where the second data is communicated from the private network to a second device or subnet that is connected to the second server. The second server can distinguish the first data from the second data according to an authentication certificate field that identifies one of a first communication interface of the first connection or a second communication interface of the second connection.

18 Claims, 6 Drawing Sheets

(56) References Cited

U.S. PATENT DOCUMENTS

2010/0218248 A1 8/2010 Nice et al.
2012/0144019 A1* 6/2012 Zhu et al. ................. 709/224

OTHER PUBLICATIONS

Vladica Stanisic and Michael Devetsikiotis, "Dynamic-based Bandwidth Allocation Policies: The Case of Overloaded Network," IEEE Communincation Society, pp. 1958-1962.*
"Deploying IPsec Virtual Private Networks", Retrieved at <<http://www.cisco.yar.ru/literature/depip_wp.pdf>>, Retrieved Date: Aug. 5, 2011, pp. 1-29.

* cited by examiner

LOAD BALANCED AND PRIORITIZED DATA CONNECTIONS

BACKGROUND

A virtual private network (VPN), or other similar data communication system, is commonly implemented to communicate data to and from a secure private network, such as from a company network to a remote office location and/or to roaming users and business travelers. A VPN is typically implemented to authenticate users and encrypt data for secure data transfer from one secure location to another via the Internet, such as when two devices are not on the same private network. Additionally, network firewalls and other data communication restrictions can be bypassed by tunneling a network connection between devices that communicate via the Internet. A tunnel connection can be utilized to deliver data packets over a network that has an incompatible network protocol, such as to deliver IP data packets with private network addresses via the Internet using delivery packets with public IP addresses.

In VPN systems, traditional load balancing or failover techniques for network load balancing or cluster solutions are not effective in deployments that have secure tunnels terminating at a server without having access to the cryptographic keys. Conventional standard load balancing technologies can load balance data communication across multiple servers. However for secure tunnel connections, redirecting the data communication from one server to another server in a server cluster is complicated because of the need to synchronize state-machines across cluster nodes and access cryptographic keys. Accordingly, load-balancing the data traffic between two network devices, across a server cluster, and with a single secure tunnel or other type of secure data connection is a difficult implementation.

SUMMARY

This Summary introduces simplified concepts of load balanced and prioritized data connections, and the concepts are further described below in the Detailed Description and/or shown in the Figures. This Summary should not be considered to describe essential features of the claimed subject matter, nor used to determine or limit the scope of the claimed subject matter.

Load balanced and prioritized data connections is described. In embodiments, a first connection can be established to communicate first data from a first server to a second server over a public network, where the first data is communicated from a private network to a first device or subnet that is connected to the second server. A second connection can be established to communicate second data from the first server to the second server over the public network, where the second data is communicated from the private network to a second device or subnet that is connected to the second server. The second server can distinguish the first data from the second data according to an authentication certificate field that identifies one of a first communication interface of the first connection or a second communication interface of the second connection.

In other embodiments, the authentication certificate field is a subject name field or a combination of authentication certificate fields that identifies the first communication interface or the second communication interface at the second server. The certificate exchange between the first and second servers over the public network can be based on Internet Key Exchange (IKE) authentication, Secure Sockets Layer (SSL) connection authentication, or based on other authentication techniques. A first authentication certificate can be associated with the first connection, and a second, different authentication certificate can be associated with the second connection. The second server can then distinguish the first data from the second data and activate the first communication interface or the second communication interface based on the first authentication certificate that is associated with the first connection, or based on the second authentication certificate that is associated with the second connection.

In other embodiments, a third connection is established to communicate the first data from the first server to a third server over the public network, where third connection is redundant of the first connection to communicate the first data from the private network to the first device or subnet that is also connected to the third server. The first connection from the first server to the second server has a higher connection priority than the third connection from the first server to the third server. The first data is communicated via the first connection based on the higher connection priority than the third connection. However, if the first connection fails, the first data can then be communicated via the third connection.

In alternate embodiments, a third connection is established to communicate the first data from a third server to a fourth server over the public network, where the third connection is redundant of the first connection to communicate the first data from the private network to the first device or subnet that is connected to the fourth server. The first connection from the first server to the second server has a higher connection priority than the third connection from the third server to the fourth server. The first data is communicated via the first connection based on the higher connection priority than the third connection. However, if the first connection fails, the first data can then be communicated via the third connection. A router is implemented to interface the private network with the first server and the third server, and the router load balances communication of the first data and the second data from one of the first server to the second server, or from the third server to the fourth server.

BRIEF DESCRIPTION OF THE DRAWINGS

Embodiments of load balanced and prioritized data connections are described with reference to the following Figures. The same numbers may be used throughout to reference like features and components that are shown in the Figures.

DETAILED DESCRIPTION

Figure 1:
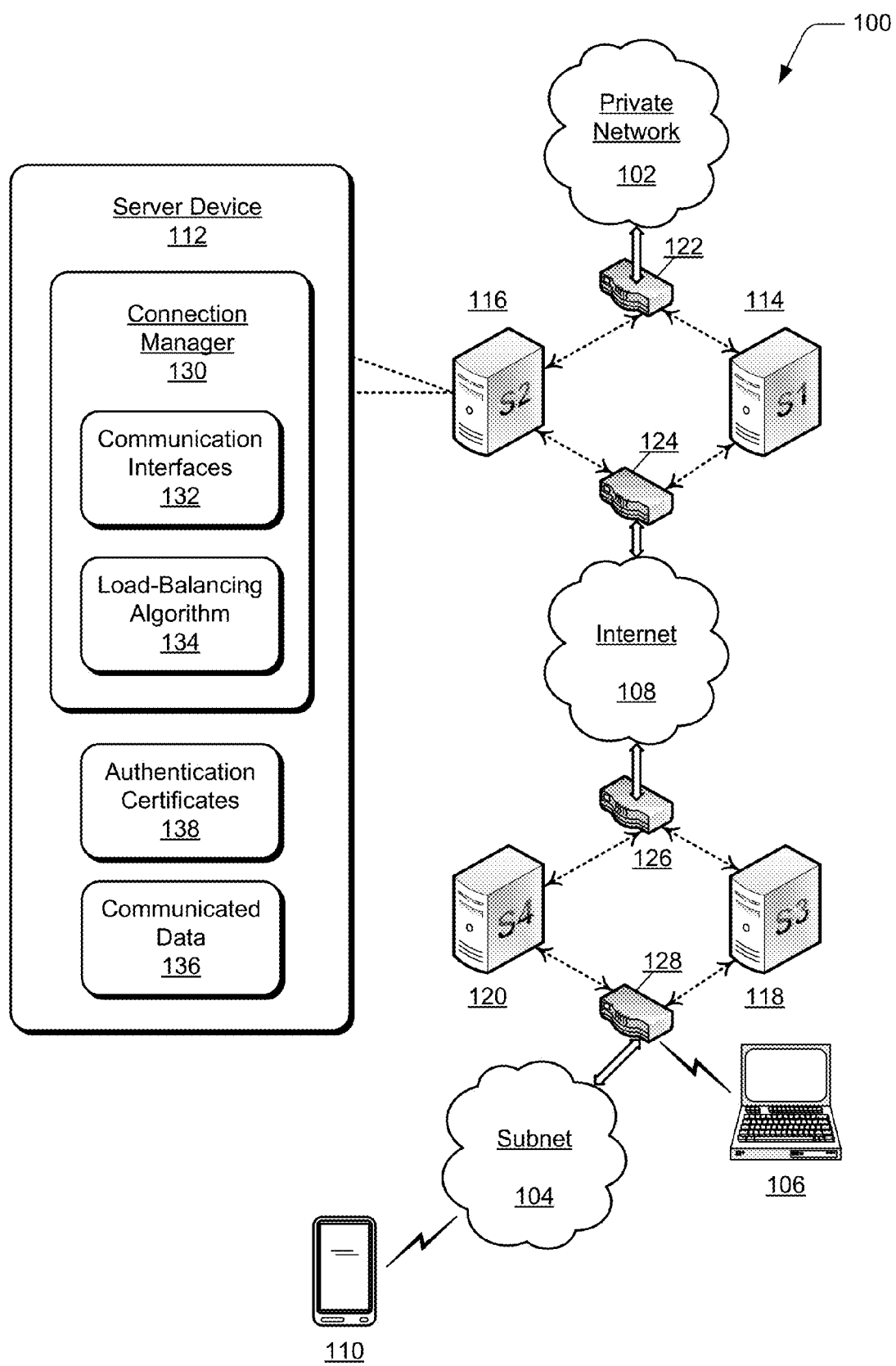
FIG. 1 illustrates an example system in which embodiments of load balanced and prioritized data connections can be implemented.

Embodiments of load balanced and prioritized data connections are described. In a data communication system, such as a VPN (virtual private network) or similar system, secure and/or non-secure data connections, as well as redundant connections can be established between server devices to securely communicate data over a public network. The secure and/or non-secure data connections can be implemented as physical and/or virtual connections in a data network, or similar overlay network. For a VPN system, tunnel connections and redundant tunnel connections can be established between server, router, and/or other network devices to securely communicate the data over the public network. The redundant connections are established for failover in the event that another connection fails.

Communication interfaces on the servers correspond to the secure or non-secure data connections and to the redundant connections, and each has an associated priority metric for load balancing when the data is communicated between the servers over the public network. Connections can be established on a communication interface that has a higher connection priority than the communication interfaces for the redundant connections. In the event of a connection failure, a connection can be established on a lower priority communication interface. A load-balancing algorithm is implemented to individually identify the communication interfaces and the corresponding connection priority metrics on each server endpoint of the connections and redundant connections.

The load-balancing algorithm also load balances the data communication traffic by determining on which server a connection terminates when establishing the connections and the redundant connections. The data communication load is distributed across the available servers, routers, line cards, or other devices in a routing system, and each device can be utilized for load balancing, while also being able to failover to another server, router, or device when a connection between two servers, routers, or devices fails. The connection-to-interface identification associates the connections (e.g., tunnel, overlay, physical, logical, and/or virtual), subnets and/or data receiving devices, and the connection priorities of the communication interfaces to load balance and provide failover at the initiating end of a connection (e.g., at a server or router device at the beginning of a connection for data communication).

A server or router device that receives communicated data can distinguish which communication interface to activate for an incoming connection when multiple communication interfaces are provisioned. An incoming connection can be distinguished based on any authentication certificate, which includes an authentication certificate field that identifies the communication interface of a corresponding connection. In embodiments, the subject name field of the authentication certificate identifies the communication interface that corresponds to a connection. In implementations, the certificate exchange between the servers and/or routers over the public network is based on Internet Key Exchange (IKE) authentication or based on other techniques, such as for Secure Sockets Layer (SSL) based connections. In addition, other fields of an authentication certificate, or derivatives, or derivatives of a combination of the other certificate fields, may be utilized to identify a communication interface that corresponds to a connection at a server and/or router device.

While features and concepts of load balanced and prioritized data connections, such as for the various connections and numerous tunneling protocols, can be implemented in any number of different devices, systems, networks, environments, and/or configurations, embodiments of load balanced and prioritized data connections are described in the context of the following example devices, systems, and methods.

FIG. 1 illustrates an example system 100 in which various embodiments of load balanced and prioritized data connections can be implemented. The example system can be implemented for data communication via a VPN (virtual private network), such as from a private network 102 to a subnet 104 and/or computing device 106 over a public network, such as the Internet 108. The example system may also be implemented for other data networks, or overlay networks, with physical and/or virtual connections established between server, router, and/or other network devices to securely communicate the data over the public network. The subnet 104 can be implemented to communicate data with various computing devices, such as computing device 110. In various systems, the computing device 106 may be a connected device in another subnet, and any of the subnets may be implemented as subnet groups that include more than one routable subnet. Additionally, any of the subnets, such as subnet 104 and another subnet that includes the computing device 106, may be implemented by a network service provider that hosts the subnets to maintain and secure data, such as documents, in a network cloud-based service.

The example system 100 also includes any number of server devices, such as represented by server device 112. The server devices can be implemented as site-to-site gateways for data communication from the private network 102 to the subnet 104 and/or computing device 106 over the public network. Although data is described herein as being communicated from the private network to subnets and/or other computing devices, data traffic can also be communicated from the subnets and computing devices back to the private network with the techniques for data communication described in embodiments for load balanced and prioritized data connections.

In this example system 100, four server devices 112 are individually identified as the server devices 114, 116, 118, and 120. The server devices are also identified as respective servers S1, S2, S3, and S4 merely for the discussion described herein. Any of the server devices may be implemented as a site-to-site gateway via which data is communicated between the private network 102, subnets, and/or computing devices over the public network. The example system also includes optional routers that are implemented to interface and facilitate data communication between the private network, subnets, and/or computing devices. For example, a router 122 interfaces the private network with servers S1 and S2; a router 124 interfaces the servers S1 and S2 with the public network (e.g., the Internet 108); a router 126 interfaces the public network with servers S3 and S4; and a router 128 interfaces the servers S3 and S4 with various subnets and/or computing devices, such as subnet 104 and computing device 106.

The server device 112 is an example implementation of the four server devices 114, 116, 118, and 120. Any of the server and/or router devices can be implemented with various components, such as one or more processors and memory devices, as well as any number and combination of differing components as further described with reference to the example device shown in FIG. 4 to implement embodiments of load balanced and prioritized data connections. In this example, the server device 112 includes a connection manager 130 that manages communication interfaces 132 and implements a load-balancing algorithm 134. In implementations, the connection manager 130 and the load-balancing algorithm 134 can be implemented as computer-executable instructions, such as software applications, and executed by one or more processors to implement the various embodiments described herein.

In the example system 100, secure and/or non-secure data connections and redundant connections can be established between the server devices 112 and/or the router devices to securely communicate data 136 over the public network. For example, a connection can be established from server S1 to server S3 for data communication from the private network 102 to the subnet 104. Similarly, redundant connections can be established from server S1 to server S4, from server S2 to server S4, and from server S2 to server S3 to communicate the data from the private network to the subnet. Additionally, a connection can be established from server S2 to server S4 for different data communicated from the private network 102 to the computing device 106. Similarly, redundant connections can be established from server S2 to server S3, from server S1 to server S3, and from server S1 to server S4 to communicate the different data from the private network to the computing device. Examples of these connections and redundant connections are further described with reference to FIG. 2. It should be noted that the described redundancy, such as with a redundant connection, may not be associated with another communication interface. Rather, the described redundancy can be embodied by an overload, and further, the described redundancy can include communication interfaces, connections, servers, routers, and/or any combination thereof.

The redundant connections can be established for failover in the event that another connection fails. The communication interfaces 132 correspond to the connections and to the redundant connections, and each has an associated priority metric for load balancing when the data is communicated between the servers over the public network. Connections can be established on a communication interface that has a higher connection priority than the communication interfaces for the redundant connections. The load-balancing algorithm 134 is implemented to individually identify the communication interfaces and the corresponding connection priority metrics on each server endpoint of the connections and redundant connections. In embodiments, the load-balancing algorithm 134 can be implemented to both utilize the authentication certificate information to match an incoming connection with a communication interface, and also define how to create the interfaces, connections, and assign the priorities across multiple servers and/or other devices, connections, servers, routers, and/or any combination thereof.

Given N subnets (or subnet groups) to be load balanced across N servers at each connection endpoint (assuming the number of subnets equals the number of servers in this example); for each of the N subnets, N interfaces are created on each end of the N servers. In embodiments, the load-balancing algorithm 134 can be extended for M subnets and N servers, where M is not equal to N. At each server, one of the N subnets corresponds to a primary connection, and the other subnets correspond to the redundant connections as assigned in a round-robin fashion. The load-balancing algorithm 134 generates the communication interface identifiers at each end of the respective server devices, where the name or identifier of a communication interface I on a server S for a subnet K is:

Subnet K's Name-preference of subnet K on the server S-I

Preference of subnet $K$ on the server $S$:preference($S$, $K,N$)=(($S-K$)%$N$)+1

The Formula to compute the route metric (e.g., connection priority) for the $I^{th}$ interface on the $S^{th}$ server for the $K^{th}$ subnet is:

Route Metric($S,K,I,N$)=preference($S,K,N$)*$N$+$I$=(($S-K$)%$N$)+1)*$N$+$I$

The load-balancing algorithm 134 also load balances the data communication traffic by determining on which server a connection terminates when establishing the connections and the redundant connections. The data communication load is distributed across the available servers and each server can be utilized for load balancing, while also being able to failover to another server when a connection between two servers fails. The load-balancing algorithm associates the connections, subnets and/or data receiving devices, and the connection priorities of the communication interfaces to load balance and provide failover at the initiating end of a connection (e.g., at a server device at the beginning of a connection for data communication). Routing protocols based on the communication interfaces provide that the router 122 between the private network 102 and the servers S1, S2 serves as a load balancer.

A server device that receives communicated data 136 can distinguish which communication interface 132 to activate for an incoming connection when multiple communication interfaces are provisioned. The data on an incoming connection can be distinguished based on an authentication certificate 138, which includes an authentication certificate field that identifies the communication interface of a corresponding connection. In embodiments, the subject name field of the authentication certificate identifies the communication interface that corresponds to a connection, and the certificate exchange between the servers over the public network can be based on Internet Key Exchange (IKE) authentication or based on other techniques, such as for SSL based connections. Alternatively or in addition, other fields of an authentication certificate, or derivatives, or derivatives of a combination of the other certificate fields, may be utilized to identify a communication interface that corresponds to a connection at a server device.

In an example implementation of the system 100, the servers S1 and S3 can be configured with a first communication interface for a first connection between the two servers, and servers S2 and S4 can be configured with a second communication interface for a second connection between the two servers. On the first communication interface at the servers S1 and S3, data is routed to the subnet 104 with a higher connection priority than different data that is routed to the computing device 106 with a lower connection priority. On the second communication interface at the servers S2 and S4, the different data is routed to the computing device 106 with a higher priority than the data that is routed to the subnet 104 with a lower connection priority. In an implementation, a routing protocol, such as RIP/OSPF, can be enabled on the communication interfaces and at the router 122 and router 128.

Accordingly, the router 122 forwards the data traffic that is communicated from the private network 102 to the subnet 104 via the servers S1 and S3 on the first communication interface based on connection priority. Similarly, the router 122 forwards the different data traffic that is communicated from the private network 102 to the computing device 106 via the servers S2 and S4 on the second communication interface based on connection priority. If the connection between the servers S1 and S3 fails, then the data traffic can be communicated from the private network 102 to the subnet 104 via the servers S2 and S4 on the second communication interface. Similarly, if the connection between the servers S2 and S4 fails, then the different data traffic can be communicated from the private network 102 to the computing device 106 via the servers S1 and S3 on the first communication interface.

Figure 2:
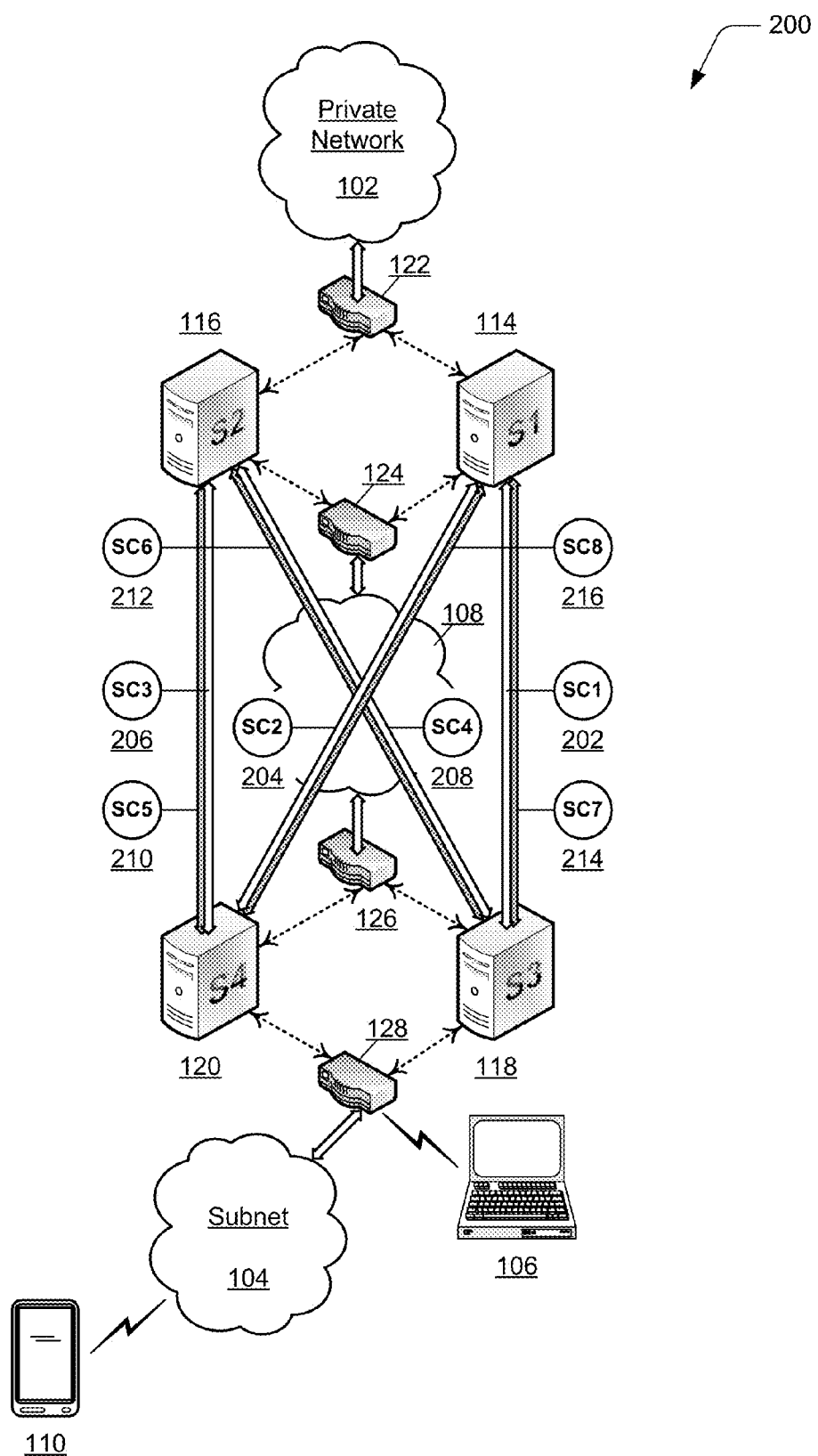
FIG. 2 further illustrates the example system for load balanced and prioritized data connections as shown in FIG. 1.

FIG. 2 illustrates an example 200 of load balanced and prioritized data connections described with reference to the components of the example system 100 shown in FIG. 1. In this example system, secure and/or non-secure data connections, as well as redundant connections are established to optimally utilize all of the server devices in the system. In an example implementation of the system, first data from the private network 102 is addressed 10.10.10.0/23 and communicated to the subnet 104 via the servers and public network (e.g., Internet 108). Different, second data from the private network is addressed 10.10.11.0/23 and communicated to the computing device 106 via the servers and public network. As noted above, although data is described as being communicated from the private network to subnets and/or other computing devices, data traffic can also be communicated from the subnets and computing devices back to the private network.

The servers S1 and S3 can be configured with a first primary connection (SC1) 202 between the two servers as the primary connection endpoints for the first data 10.10.10.0/23 that is communicated to the subnet 104. Other redundant connections can also be established between the server devices to communicate the first data over the public network, such as connection (SC2) 204, connection (SC3) 206, and connection (SC4) 208.

Similarly, the servers S2 and S4 can be configured with a second primary connection (SC5) 210 between the two servers as the primary connection endpoints for the second data 10.10.11.0/23 that is communicated to the computing device 106. Other redundant connections can also be established between the server devices to communicate the second data over the public network, such as connection (SC6) 212, connection (SC7) 214, and connection (SC8) 216.

The following communication interface chart for the described example indicates correlations of the server devices, the connections, interface identifiers, the first and second data, and the priority metric (e.g., connection priority):

| Servers | Communication Interface Identifier | Connection (SC) | Data Route | Metric (priority) |
| --- | --- | --- | --- | --- |
| S1, S3 | S-1-1 | 1 | 10.10.10.0/23 | 3 |
| S1, S4 | S-1-2 | 2 | 10.10.10.0/23 | 4 |
| S1, S4 | D-2-1 | 8 | 10.10.11.0/23 | 5 |
| S1, S3 | D-2-2 | 7 | 10.10.11.0/23 | 6 |
| S2, S4 | D-1-1 | 5 | 10.10.11.0/23 | 3 |
| S2, S3 | D-1-2 | 6 | 10.10.11.0/23 | 4 |
| S2, S3 | S-2-1 | 4 | 10.10.10.0/23 | 5 |
| S2, S4 | S-2-2 | 3 | 10.10.10.0/23 | 6 |

A communication interface identifier (also referred to as a communication interface name) indicates the endpoint of a corresponding connection. In this example, the communication interface S-1-1 is created and corresponds to connection (SC1) between servers S1 and S3. The data route and metric are assigned to indicate that, on server S1 for the first data 10.10.10.0/23 that is communicated to the subnet 104, the primary communication interface terminates on server S3, and the redundant communication interface S-1-2 that corresponds to connection (SC2) between servers S1 and S4 terminates on server S4.

With the communication interface routes configured as detailed in the communication interface chart, the router 122 routes the first data 10.10.10.0/23 that is communicated to the subnet 104 via the servers S1 and S3 on the communication interface S-1-1 that corresponds to the connection (SC1). The router 122 also routes the second data 10.10.11.0/23 that is communicated to the computing device 106 via servers S2 and S4 on the communication interface D-1-1 that corresponds to the connection (SC5), which then load balances the data communication traffic.

If the server S1 fails, then the first data 10.10.10.0/23 can be communicated to the subnet 104 via the servers S2 and S3 on the communication interface S-2-1 that corresponds to the connection (SC4), and the second data 10.10.11.0/23 continues to be communicated to the computing device 106 via the servers S2 and S4 on the communication interface D-1-1 that corresponds to the connection (SC5), which load balances the data communication traffic at the servers S3 and S4.

In this example system, and as included in the communication interface chart, the priority metric for each communication interface that designates the connection priority for a corresponding connection is generated with a base3 bit mask, based on the following: (0,0) is metric 0; (0,1) is metric 1; (1,0) is metric 2; (1,1) is metric 3; (1,2) is metric 4; (2,1) is metric 5; and (2,2) is metric 6. Accordingly, the router 122 can determine from the priority metric which communication interface to select first for data communication of data that is intended for the subnet 104, the computing device 106, or other subnets and devices. Alternative techniques to identify the communication interfaces and the metric priorities may be implemented. Further, the base3 bit mask is merely an example that can be extended to baseN to designate connection priorities for any number of servers, routers, and/or subnets in a system.

In an example implementation, the connection (SC1) 202 is established to communicate first data from the server 51 to the server S3 over the public network (e.g., the Internet 108), where the first data is communicated from the private network 102 to the subnet 104 that is connected to the server S3 via the router 128 and/or one or more networks. Another connection (SC7) 214 is also established to communicate second data from the server 51 to the server S3 over the public network, where the second data is communicated from the private network to the computing device 106 that is connected to the server S3 via the router 128 and/or one or more networks. The connection manager 130 at the server S3 can distinguish the first data from the second data according to a subject name field of an authentication certificate that identifies the communication interface S-1-1 of the connection (SC1) or the communication interface D-2-2 of the connection (SC7).

A certificate exchange between the server 51 and the server S3 over the public network can be based on Internet Key Exchange (IKE) authentication, and a first authentication certificate 138 is associated with the connection (SC1) and a different, second authentication certificate is associated with the connection (SC7) in this example. The server 51 can authenticate the connection (SC1) to the server S3 with the first authentication certificate, or authenticate the connection (SC7) to the server S3 with the second authentication certificate. Accordingly, the server S3 can then activate the communication interface S-1-1 based on the first authentication certificate that is associated with the connection (SC1), or activate the communication interface D-2-2 based on the second authentication certificate that is associated with the connection (SC7).

Another connection (SC2) 204 can also be established to communicate the first data from the server 51 to the server S4 over the public network, where the first data is communicated from the private network 102 to the subnet 104 that is also connected to the server S4 via the router 128 and/or one or more networks. The connection (SC2) 204 is redundant of the connection (SC1) to communicate the first data from the private network to the subnet, and the connection (SC1) from the server 51 to the server S3 has a higher connection priority than the connection (SC2) from the server 51 to the server S4. The first data is communicated via the connection (SC1) based on the higher connection priority than the connection (SC2). However, if the connection (SC1) fails, then the first data is communicated via the connection (SC2).

Another connection (SC3) 206 can also be established to communicate the first data from the server S2 to the server S4 over the public network, where the first data is communicated from the private network 102 to the subnet 104 that is connected to the server S4 via the router 128 and/or one or more networks. The connection (SC3) is redundant of the connection (SC1) to communicate the first data from the private network to the subnet, and the connection (SC1) from the server 51 to the server S3 has a higher connection priority than the connection (SC3) from the server S2 to the server S4.

Another connection (SC4) 208 can also be established to communicate the first data from the server S2 to the server S3 over the public network, where the first data is communicated from the private network 102 to the subnet 104 that is connected to the server S3 via the router 128 and/or one or more networks. The connection (SC4) is redundant of the connection (SC1) to communicate the first data from the private network to the subnet, and the connection (SC1) from the server 51 to the server S3 has a higher connection priority than the connection (SC4) from the server S2 to the server S3.

Example method 300 is described with reference to FIG. 3 in accordance with one or more embodiments of load balanced and prioritized data connections. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 3:
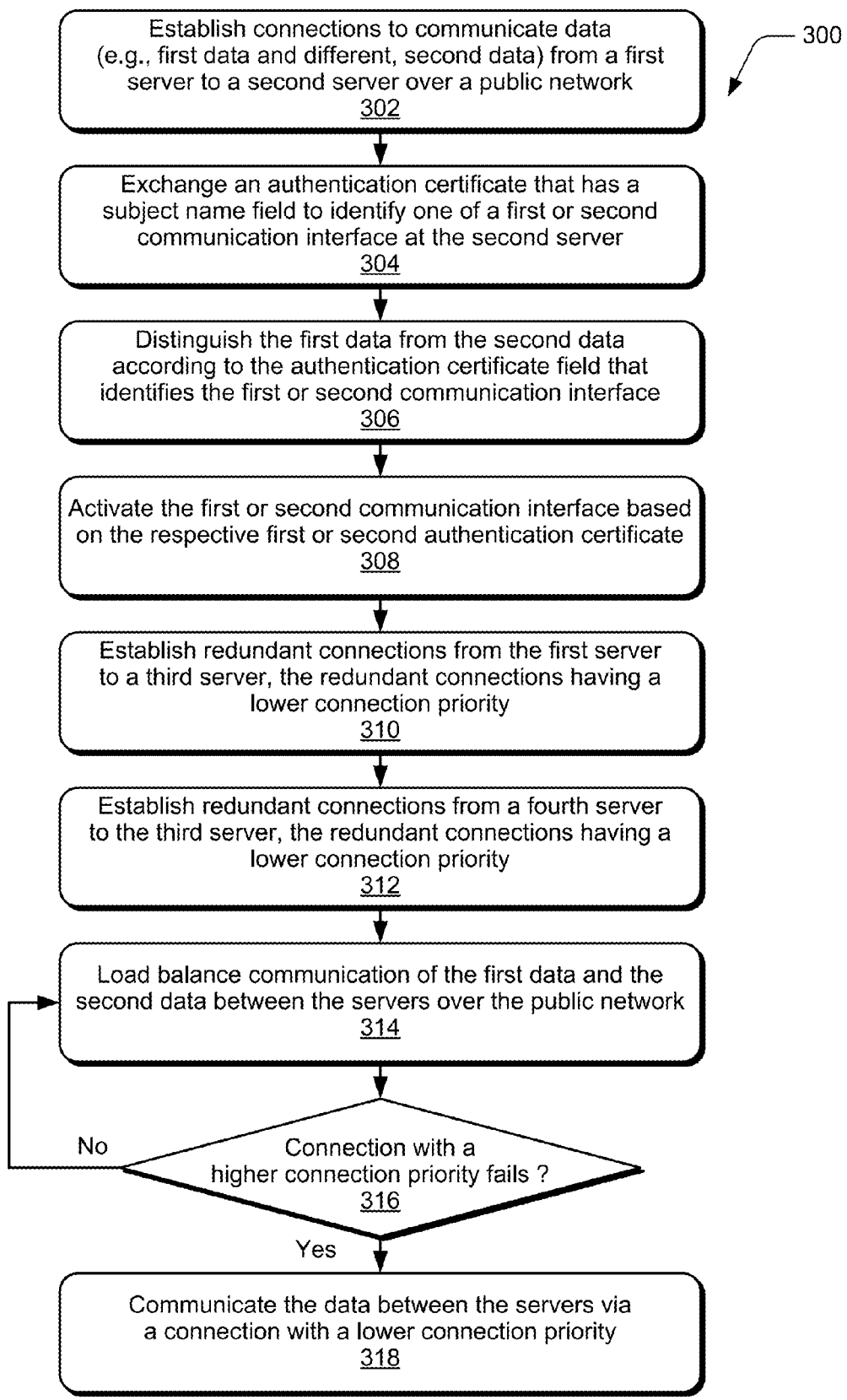
FIG. 3 illustrates example method(s) for load balanced and prioritized data connections in accordance with one or more embodiments.

FIG. 3 illustrates example method(s) 300 of load balanced and prioritized data connections. The order in which the method blocks are described are not intended to be construed as a limitation, and any number of the described method blocks can be combined in any order to implement a method, or an alternate method.

At block 302, connections are established to communicate data (e.g., first data and different, second data) from a first server to a second server over a public network. For example, the connection (SC1) 202 is established to communicate first data from the server 51 to the server S3 over a public network (e.g., the Internet 108), where the first data is communicated from the private network 102 to the subnet 104 that is connected to the server S3 via the router 128 and/or one or more networks. The connection (SC7) 214 is also established to communicate second data from the server 51 to the server S3 over the public network, where the second data is communicated from the private network to the computing device 106 that is connected to the server S3 via the router 128 and/or one or more networks.

At block 304, an authentication certificate is exchanged and the certificate has a subject name field to identify one of a first communication interface or a second communication interface at the second server. For example, a certificate exchange between the server 51 and the server S3 over the public network is based on Internet Key Exchange (IKE) authentication, and a first authentication certificate is associated with the connection (SC1) and a different, second authentication certificate is associated with the connection (SC7). The server 51 authenticates the first connection (SC1) to the server S3 with the first authentication certificate, or authenticates the second connection (SC7) to the server S3 with the second authentication certificate. The authentication certificate field is a subject name field that identifies one of the first communication interface or the second communication interface at the second server.

At block 306, the first data is distinguished from the second data according to the authentication certificate field that identifies the first communication interface of the first connection or the second communication interface of the second connection. For example, the connection manager 130 at the server S3 distinguishes the first data from the second data according to the subject name field of the authentication certificate that identifies the communication interface S-1-1 of the connection (SC1) or the communication interface D-2-2 of the connection (SC7), as indicated in the communication interface chart described above with reference to FIG. 2.

At block 308, the first communication interface is activated based on the first authentication certificate that is associated with the first connection, or the second communication interface is activated based on the second authentication certificate that is associated with the second connection. For example, the server S3 then activates the first communication interface S-1-1 based on the first authentication certificate that is associated with the connection (SC1), or activates the second communication interface D-2-2 based on the second authentication certificate that is associated with the connection (SC7).

At block 310, redundant connections are established from the first server to a third server, the redundant connections having a lower connection priority. For example, the connection (SC2) 204 is also established to communicate the first data from the server S1 to the server S4 over the public network, where the first data is communicated from the private network 102 to the subnet 104 that is also connected to the server S4 via the router 128 and/or one or more networks. The connection (SC2) is redundant of the connection (SC1) to communicate the first data from the private network to the subnet, and the connection (SC1) from the server S1 to the server S3 has a higher connection priority than the redundant connection (SC2) from the server S1 to the server S4.

At block 312, redundant connections are established from a fourth server to the third server, the redundant connections having a lower connection priority. For example, the connection (SC3) 206 is also established to communicate the first data from the server S2 to the server S4 over the public network, where the first data is communicated from the private network 102 to the subnet 104 that is connected to the server S4 via the router 128 and/or one or more networks. The connection (SC3) is redundant of the connection (SC1) to communicate the first data from the private network to the subnet, and the connection (SC1) from the server S1 to the server S3 has a higher connection priority than the connection (SC3) from the server S2 to the server S4.

At block 314, communication of the first data and the second data is load balanced between the servers over the public network. For example, the router 122 routes the first data that is communicated to the subnet 104 via the servers S1 and S3 on the communication interface S-1-1 that corresponds to the connection (SC1) 202. The router 122 also routes the second data that is communicated to the computing device 106 via the servers S2 and S4 on the communication interface D-1-1 that corresponds to the connection (SC5) 210, which then load balances the data communication traffic.

At block 316, a determination is made as to whether a connection with a higher connection priority fails. If a connection with the higher connection priority is maintained (i.e., no from block 316), then the method continues at block 314 to load balance communication of the first data and the second data between the servers. If a connection with a higher connection priority fails (i.e., yes from block 316), then at block 318, the data is communicated between the servers via a redundant connection with a lower connection priority. For example, if the server S1 fails, then the first data is communicated to the subnet 104 via the servers S2 and S3 on the communication interface S-2-1 that corresponds to the connection (SC4), and the second data continues to be communicated to the computing device 106 via the servers S2 and S4 on the communication interface D-1-1 that corresponds to connection (SC5), which load balances the data communication traffic at servers S3 and S4.

Figure 4:
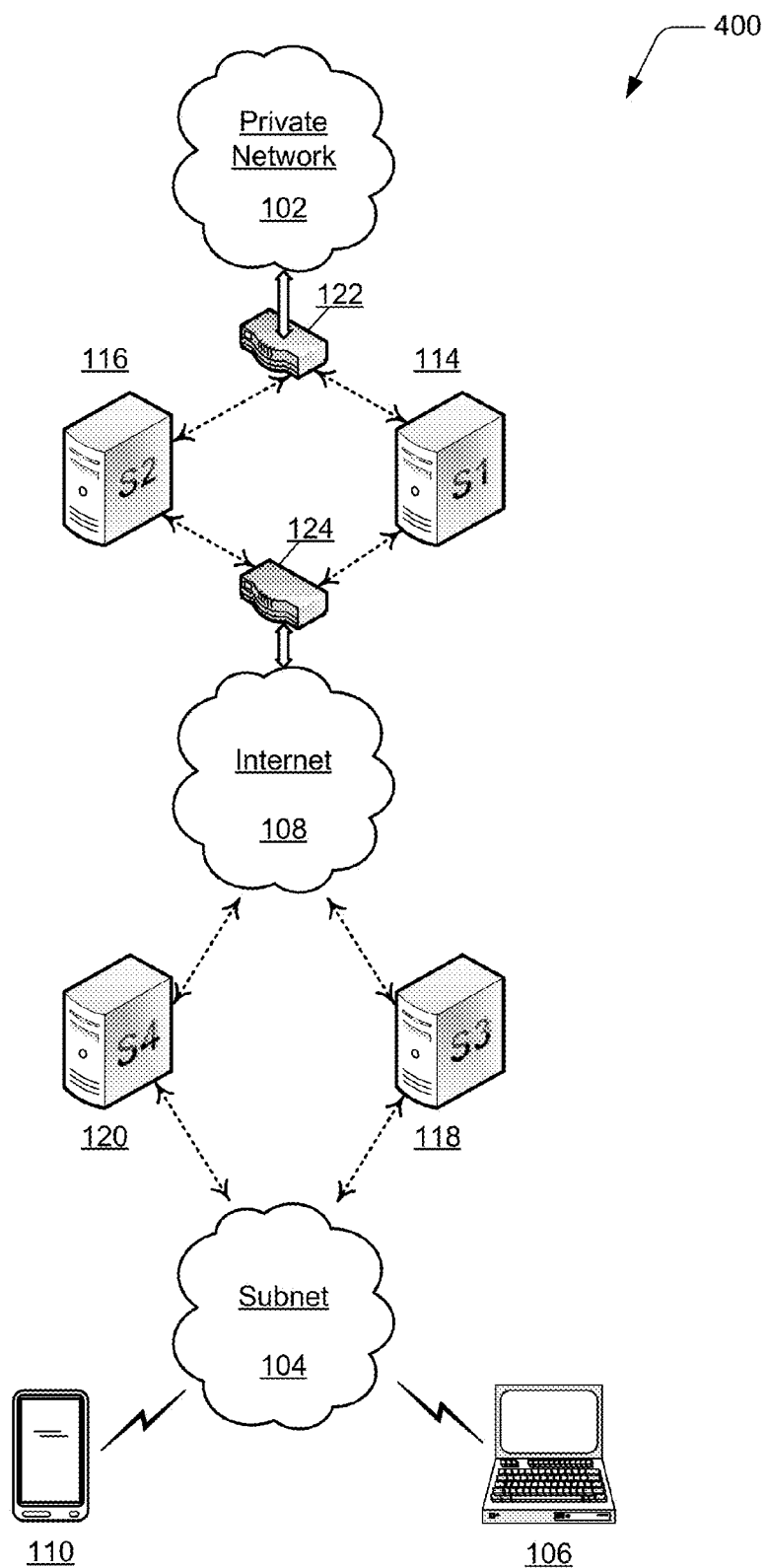
FIG. 4 illustrates an alternate configuration of the example system for load balanced and prioritized data connections as shown in FIG. 1.

FIG. 4 illustrates an alternate example 400 of load balanced and prioritized data connections described with reference to an alternate configuration of the components of the example system 100 shown in FIG. 1. In this example system, the server S3 118 and the server S4 120 operate in a cluster mode for load-balancing the secure and/or non-secure data connections that can be created between the servers, routers, and devices for data communication from the private network 102 to the subnet 104 and the computing devices over the public network. Rather than the routers 126 and 128 (shown in FIG. 1), the servers S3 and S4 interface the subnet 104 with the public network (e.g., the Internet 108), and operate in the cluster mode for load-balancing.

Figure 5:
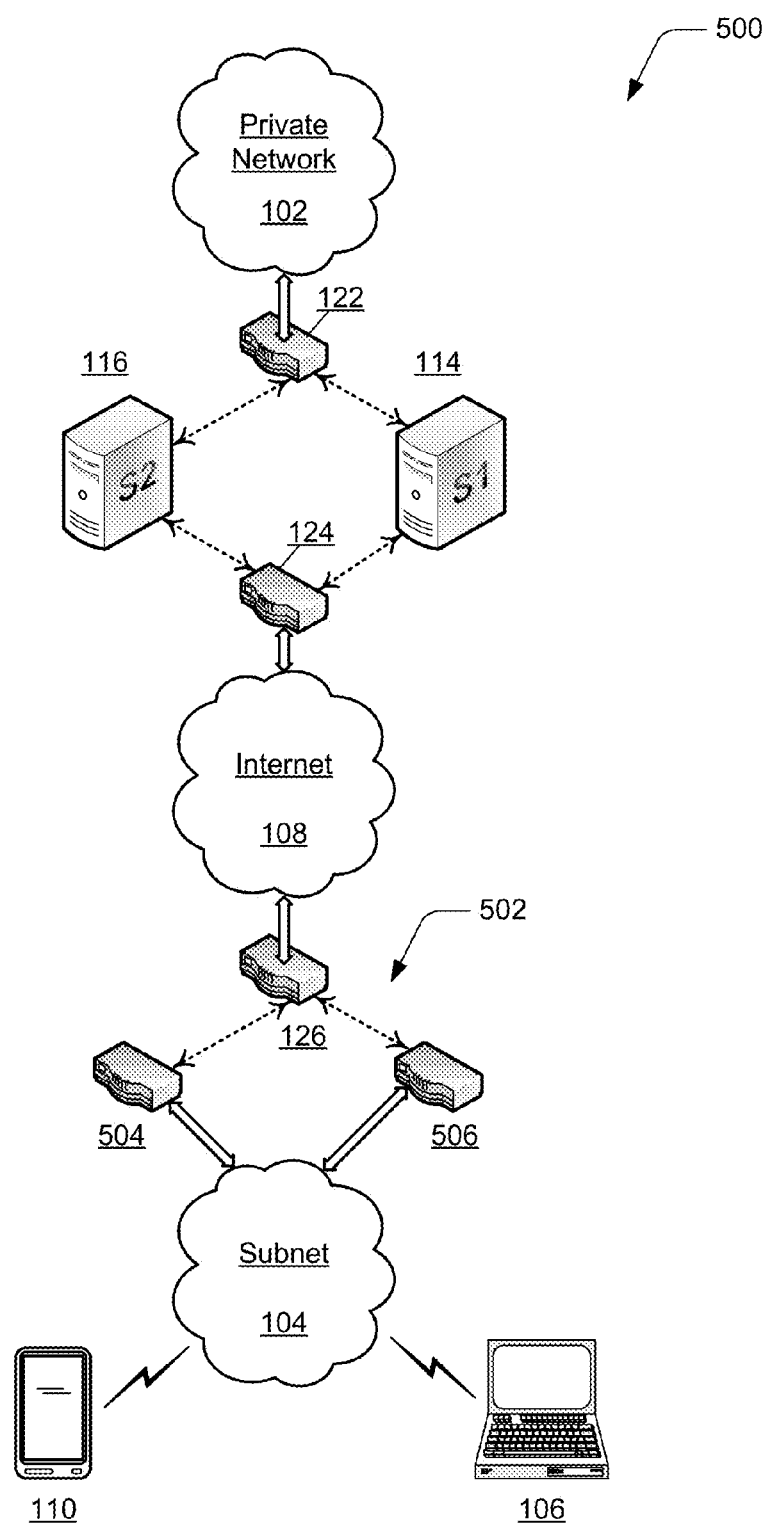
FIG. 5 illustrates another alternate configuration of the example system for load balanced and prioritized data connections as shown in FIG. 1.

FIG. 5 illustrates another alternate example 500 of load balanced and prioritized data connections described with reference to an alternate configuration of the components of the example system 100 shown in FIG. 1. In this example system, an alternate routing system 502 includes the router 126, as well as a routing sub-system 504 and routing sub-system 506 for load-balancing the secure and/or non-secure data connections that can be created between the servers, routers, and devices for data communication from the private network 102 to the subnet 104 and the computing devices over the public network.

Figure 6:
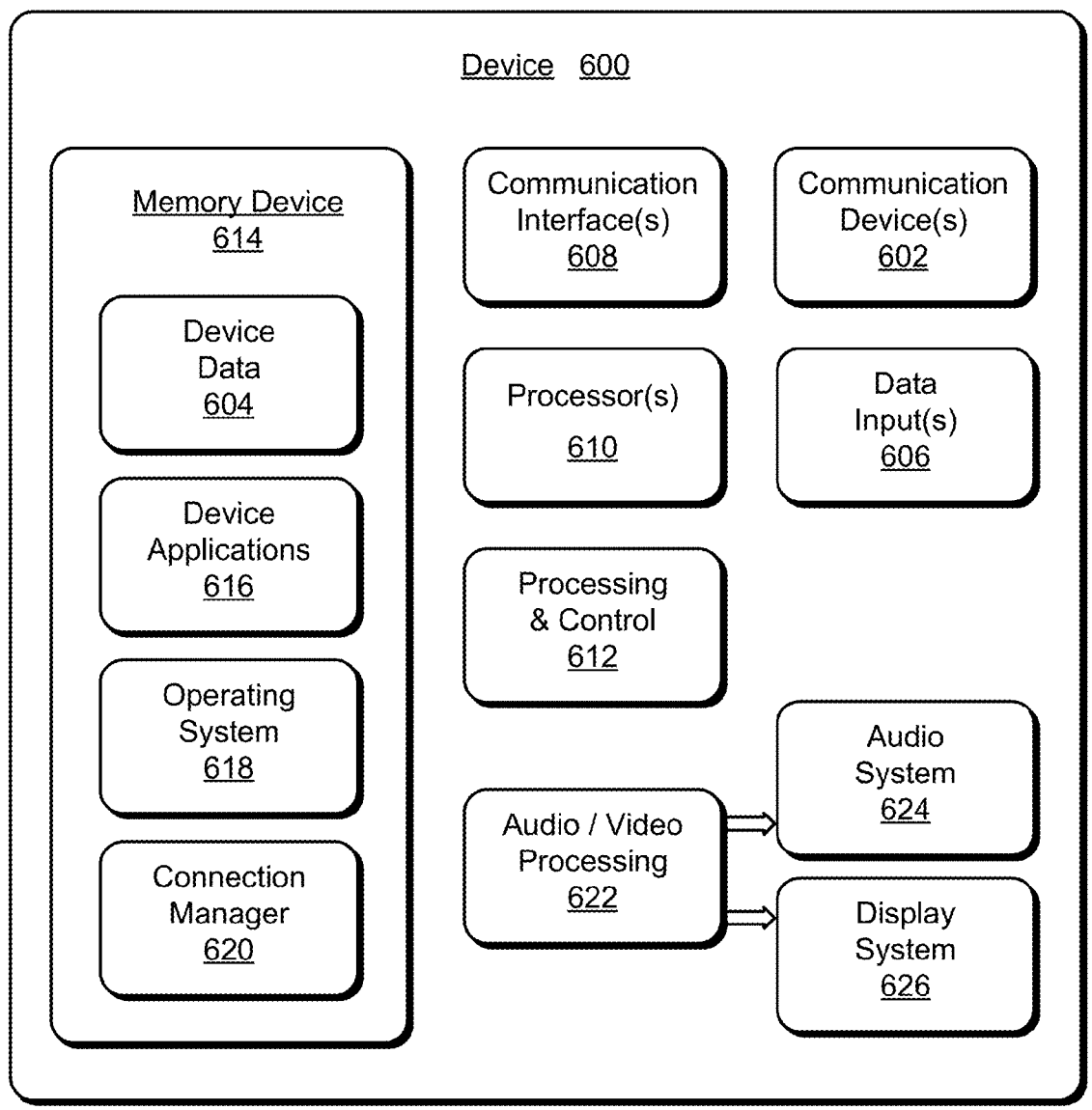
FIG. 6 illustrates various components of an example device that can implement embodiments of load balanced and prioritized data connections.

FIG. 6 illustrates various components of an example device 600 that can be implemented as any of the devices, server devices, or services implemented by devices, described with reference to the previous FIGS. 1-5. The example device 600 includes communication devices 602 that enable wired and/or wireless communication of device data 604, such as received data, data that is being received, data scheduled for broadcast, data packets of the data, etc. The device data or other device content can include configuration settings of the device, media content stored on the device, and/or information associated with a user of the device. Media content stored on the device can include any type of audio, video, and/or image data.

The device includes one or more data inputs 606 via which any type of data, media content, and/or inputs can be received, such as user-selectable inputs and any other type of audio, video, and/or image data received from any content and/or data source. The device 600 also includes communication interfaces 608, such as any one or more of a serial, parallel, network, or wireless interface. The communication interfaces provide a connection and/or communication links between the device and a communication network by which other electronic, computing, and communication devices communicate data with the device.

The device 600 includes one or more processors 610 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 612. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 600 also includes one or more memory devices 614 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device.

Computer readable media can be any available medium or media that is accessed by a computing device. By way of example, and not limitation, computer readable media may comprise storage media and communication media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computer.

Communication media typically embody computer-readable instructions, data structures, program modules, or other data in a modulated data signal, such as carrier wave or other transport mechanism. Communication media also include any information delivery media. A modulated data signal has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 614 provides data storage mechanisms to store the device data 604, other types of information and/or data, and various device applications 616. For example, an operating system 618 can be maintained as a software application with the memory device and executed on the processors. The device applications may also include a device manager, such as any form of a control application, software application, signal processing and control module, code that is native to a particular device, a hardware abstraction layer for a particular device, and so on. In this example, the device applications 616 include a connection manager 620 that implements embodiments of load balanced and prioritized data connections as described herein.

The device 600 also includes an audio and/or video processing system 622 that generates audio data for an audio system 624 and/or generates display data for a display system 626. The audio system and/or the display system may include any devices that process, display, and/or otherwise render audio, video, display, and/or image data. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are external components to the device. Alternatively, the audio system and/or the display system are integrated components of the example device, such as an integrated touch-screen display.

Although embodiments of load balanced and prioritized data connections have been described in language specific to features and/or methods, the appended claims are not necessarily limited to the specific features or methods described. Rather, the specific features and methods are disclosed as example implementations of load balanced and prioritized data connections.

The invention claimed is:

1. A data communication system, comprising:
  a first connection, implemented at least in part using hardware, and established to communicate first data from a first server to a second server over a public network, the first data configured for communication from a private network that is connected to the first server to a first device that is connected to the second server;
  a first authentication certificate that is associated with the first connection, the first authentication certificate including a first authentication certificate field that identifies a first communication interface of the first connection, the first authentication certificate field including at least an indication of a first subnet associated with the first device and a first priority of the first connection on the second server;
  a second connection, implemented at least in part using hardware, and established to communicate second data from the first server to the second server over the public network, the second data configured for communication from the private network that is connected to the first server to a second device that is connected to the second server;
  a second authentication certificate that is associated with the second connection, the second authentication certificate including a second authentication certificate field that identifies a second communication interface of the second connection, the second authentication certificate field including at least an indication of a second subnet associated with the second device and a second priority of the second connection on the second server; and
  a load-balancing algorithm configured to generate, based at least in part on the first priority and the second priority, at least the first authentication certificate field that identifies the first communication interface of the first connection and the second authentication certificate field that identifies the second communication interface of the second connection, wherein
  the second server configured to distinguish the first data of the first connection from the second data of the second connection according to the first authentication certificate field of the first authentication certificate or the second authentication certificate field of the second authentication certificate.

2. The data communication system as recited in claim 1, wherein the second server is further configured to distinguish multiple incoming connections from the first server, and activate a corresponding communication interface for a respective incoming connection.

3. The data communication system as recited in claim 1, wherein the first authentication certificate field is a first subject name.

4. The data communication system as recited in claim 3, wherein a certificate exchange between the first and second servers over the public network is based on Internet Key Exchange (IKE) authentication or based on Secure Sockets Layer (SSL) connection authentication.

5. The data communication system as recited in claim 1, wherein the second server is configured to one of activate the first communication interface based on the first authentication certificate that is associated with the first connection, or activate the second communication interface based on the second authentication certificate that is associated with the second connection.

6. The data communication system as recited in claim 1, wherein the first server is configured to one of authenticate the first connection to the second server with the first authentication certificate, or authenticate the second connection to the second server with the second authentication certificate.

7. The data communication system as recited in claim 1, further comprising:
  a router situated between the private network and the first server and between the private network and a third server;
  a third connection established to communicate the first data from the first server to the third server over the public network, the first data configured for communication from the private network to the first device that is connected to the third server; and wherein:
  the third connection is redundant with the first connection to communicate the first data from the private network to the first device;
  the first priority of the first connection from the first server to the second server has a higher connection priority than a third priority of the third connection from the first server to the third server; and the router is configured to load balance the first data and the second data based at least in part on routing protocol costs that are based at least in part on the first priority of the first connection, the second priority of the second connection, and the third priority of the third connection.

8. The data communication system as recited in claim 7, wherein:

the router is further configured to utilize the third connection to communicate the first data in the event that the first connection fails.

9. The data communication system as recited in claim 1, further comprising:

a router situated between the private network and the first server and between the private network and a third server;

a third connection established to communicate the first data from the third server to a fourth server over the public network, the first data configured for communication from the private network to the first device that is connected to the fourth server; wherein:

the third connection is redundant with the first connection to communicate the first data from the private network to the first device;

the first priority of the first connection from the first server to the second server has a higher connection priority than a third priority of the third connection from the third server to the fourth server; and the router is configured to load balance the first data and the second data based at least in part on routing protocol costs that are based at least in part on the first priority of the first connection, the second priority of the second connection, and the third priority of the third connection.

10. A method, comprising:

establishing a first connection to receive, at a second server, first data from a first server over a public network;

authenticating the first connection with a first authentication certificate that includes a first authentication certificate field that identifies a first communication interface of the first connection, the first authentication certificate field including at least an indication of a first subnet and a first priority of the first connection on the second server;

establishing a second connection to receive second data from the first server over the public network;

authenticating the second connection with a second authentication certificate that includes a second authentication certificate field that identifies a second communication interface of the second connection, the second authentication certificate field including at least an indication of a second subnet and a second priority of the second connection on the second server;

receiving the first data over the first connection from a private network via the first subnet that is connected to the second server; and distinguishing, at the second server, the first data from the second data according to the first authentication certificate field of the first authentication certificate;

generating, using a load-balancing algorithm based at least in part on the first priority and the second priority, at least the first authentication certificate field that identifies the first communication interface of the first connection and the second authentication certificate field that identifies the second communication interface of the second connection; and activating the first communication interface for an incoming connection.

11. A data communication system, comprising:

a first server, implemented at least in part using hardware, configured to establish a first connection to communicate first data from the first server to a second server over a public network, the first data configured for communication from a private network to a first subnet that is connected to the second server, the first connection established using a first authentication certificate that is associated with the first connection, the first authentication certificate including a first authentication certificate field that identifies a first communication interface of the first connection, the first authentication certificate field including at least an indication of the first subnet and a first priority of the first connection on the second server; and a third server, implemented at least in part using hardware, configured to establish a second connection to communicate the first data from the third server to the second server over the public network, the second connection being redundant with the first connection, the second connection established using a second authentication certificate that is associated with the second connection, the second authentication certificate including a second authentication certificate field that identifies a second communication interface of the second connection, the second authentication certificate field including at least an indication of the first subnet and a second priority of the second connection on the second server, and the first priority being a higher connection priority than the second priority; and a load-balancing algorithm configured to generate, based at least in part on the first priority and the second priority, at least the first authentication certificate field that identifies the first communication interface of the first connection and the second authentication certificate field that identifies the second communication interface of the second connection, wherein the second server is configured to distinguish between the first server and the third server as being a data source of an incoming question according to an authentication certificate field of the incoming connection matching either the first authentication certificate field or the second authentication certificate field.

12. The data communication system as recited in claim 11, wherein the first authentication certificate field is a subject name field.

13. The data communication system as recited in claim 11, further comprising a router configured to:

route the first data via the first connection based at least on the first priority of the first connection being higher than the second priority of the second connection; and re-route the first data via the second connection based at least on the first connection failing.

14. The data communication system as recited in claim 11, further comprising:

a router situated between the private network and the first server and situated between the private network and the third server, and wherein:

the first server is configured to communicate to the router a first routing priority metric of a first communication interface associated with the first connection, the first routing priority metric based at least on the first priority; and the third server is configured to communicate to the router a second routing priority metric of a second communication interface associated with the second connection, the second routing priority metric based at least on the second priority.

15. The method as recited in claim 10, further comprising:

establishing a third connection to receive the first data from a third server and to provide the first data to a fourth server over the public network, the third connection being redundant with the first connection to communicate the first data from the private network to the first subnet, the third connection having a third priority that is a lower connection priority than the first priority of the first connection; and load balancing, by a router situated between the private network and the first server and situated between the private network and the third server, the first data and the second data based, at least in part, on routing protocol costs that are based on the first priority, the second priority, and the third priority.

16. The method as recited in claim 10, further comprising:

establishing a third connection to receive the first data from a third server over the public network, the third connection being redundant with the first connection to communicate the first data from the private network to the first subnet, the third connection having a third priority that is a lower connection priority than the first priority of the first connection; and load balancing, by a router situated between the private network and the first server and situated between the private network and the third server, the first data and the second data based at least on routing protocol costs that are based on the first priority, the second priority, and the third priority.

17. The data communication system as recited in claim 11, wherein:

the first server is further configured to establish a third connection to communicate second data from the first server to a fourth server over the public network, the second data configured for communication from the private network to a second subnet that is connected to the fourth server, the third connection established using a third authentication certificate that is associated with the third connection, the third authentication certificate including a third authentication certificate field that identifies a third communication interface of the third connection, the third authentication certificate field including at least an indication of the second subnet and a third priority of the third connection on the second server;

the third server is further configured to establish a fourth connection to communicate the second data from the third server to the fourth server over the public network, the fourth connection established using a fourth authentication certificate that is associated with the fourth connection, the fourth authentication certificate including a fourth authentication certificate field that identifies a fourth communication interface of the fourth connection, the fourth authentication certificate field including at least an indication of the second subnet and a fourth priority of the second connection on the fourth server; and the data communication system further comprises a router configured to load balance at least the first data and the second data across the first connection, the second connection, the third connection, and the fourth connection using router policy metrics that are based at least in part on the first priority, the second priority, the third priority, and the fourth priority.

18. The data communication system as recited in claim 17, wherein the fourth priority is higher than the second priority, and wherein the router is configured to re-route the second traffic from the fourth connection to the second connection based at least on the fourth connection failing.

* * * * *